United States Patent
Zhang et al.

(10) Patent No.: US 10,915,384 B2
(45) Date of Patent: Feb. 9, 2021

(54) INFORMATION PROCESSING METHOD AND DEVICE

(71) Applicant: BEIJING XINGXUAN TECHNOLOGY CO., LTD., Beijing (CN)

(72) Inventors: Tongyu Zhang, Beijing (CN); Zhonghui Pan, Beijing (CN)

(73) Assignee: BEIJING XINGXUAN TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/744,753

(22) Filed: Jan. 16, 2020

(65) Prior Publication Data

US 2020/0151039 A1 May 14, 2020

Related U.S. Application Data

(63) Continuation of application No. PCT/CN2018/072232, filed on Jan. 11, 2018.

(30) Foreign Application Priority Data

Jul. 19, 2017 (CN) .......................... 2017 1 0590488

(51) Int. Cl.
  *G06F 3/00* (2006.01)
  *G06F 9/54* (2006.01)
  *G06F 16/955* (2019.01)

(52) U.S. Cl.
  CPC .............. *G06F 9/547* (2013.01); *G06F 9/541* (2013.01); *G06F 16/955* (2019.01)

(58) Field of Classification Search
  CPC ...................................................... G06F 9/541
  (Continued)

(56) References Cited

U.S. PATENT DOCUMENTS 7,162,744 B2   1/2007   Reasons et al.
9,544,295 B2   1/2017   Fang
(Continued)

FOREIGN PATENT DOCUMENTS

CN   103942093 A   7/2014
CN   104461512 A   3/2015
(Continued)

OTHER PUBLICATIONS

Shyue Ping Ong, The Materials Application Programming Interface (API): A simple, flexible and efficient API for materials data based on REpresentational State Transfer (REST) principles. (Year: 2014).*
(Continued)

*Primary Examiner* — Lechi Truong (57) ABSTRACT

An information processing method and apparatus are provided. The method includes: receiving information about a target application, wherein the target application includes a service module set comprising a plurality of service modules, each of which includes a page set and a module identifier, and each of the pages includes a page identifier; parsing the information to determine whether the information includes an information source identifier, a first module identifier, and a first page identifier; and, if the information includes these contents, determining whether the information source identifier meets a preset condition, and, if so, calling a preset jump protocol to jump to a target page based on the first module identifier and the first page identifier. The target page is a page that is identified by the first page identifier and included in a page set included in a service module identified by the first module identifier.

14 Claims, 6 Drawing Sheets

(58) Field of Classification Search
USPC .......................................................... 719/328
See application file for complete search history.

(56) References Cited

U.S. PATENT DOCUMENTS

| | | | |
|---|---|---|---|
| 9,984,047 B2 | 5/2018 | Hu et al. | |
| 2016/0328751 A1 | 11/2016 | Park | |
| 2017/0169123 A1* | 6/2017 | Reshadi | G06F 16/957 |
| 2019/0182562 A1 | 6/2019 | Peng et al. | |

FOREIGN PATENT DOCUMENTS

| | | |
|---|---|---|
| CN | 104484193 A | 4/2015 |
| CN | 104580074 A | 4/2015 |
| CN | 105354034 A | 2/2016 |
| CN | 105357561 A | 2/2016 |
| CN | 105872839 A | 8/2016 |
| CN | 106294372 A | 1/2017 |
| CN | 106294719 A | 1/2017 |
| CN | 106411930 A | 2/2017 |
| CN | 106559386 A | 4/2017 |
| CN | 106815374 A | 6/2017 |
| CN | 107357914 A | 11/2017 |
| WO | 2017120360 A1 | 7/2017 |

OTHER PUBLICATIONS

PCT International Search Report and the Written Opinion dated Mar. 28, 2018, issued in related International Application No. PCT/CN2018/072232 (10 pages).
First Search dated Mar. 12, 2018, issued in related Chinese Application No. 201710590488.1 (2 pages).
Second Office Action dated May 14, 2018, issued in related Chinese Application No. 201710590488.1, with English machine translation (16 pages).
Baidu Experience, "How WeChat shares news", updated Jan. 3, 2014, accessed online: https://jingyan.baidu.com/article/8ebacdf0dd035949f65cd512 on Oct. 23, 2020 (3 pages).

* cited by examiner

INFORMATION PROCESSING METHOD AND DEVICE

CROSS-REFERENCE TO RELATED APPLICATION

This application is a continuation application of International Patent Application No. PCT/CN2018/072232, filed on Jan. 11, 2018, which is based on and claims priority to the Chinese Patent Application No. 201710590488.1, filed on Jul. 19, 2017 and entitled "INFORMATION PROCESSING METHOD AND DEVICE." The above-referenced applications are incorporated herein by reference in their entirety.

TECHNICAL FIELD

This application relates to the field of computer technologies, and more specifically, to the field of Internet technologies, and in particular, to an information processing method and apparatus.

BACKGROUND

Pages included in conventional client applications are usually independent of each other. Each page may maintain its own logic, and different pages may be loosely coupled with each other. Different pages may invoke or jump to each other by passing related parameters, but one page cannot access data on another page. Therefore, conventional client applications cannot handle complex invoking logic.

SUMMARY

This application provides an improved information processing method and apparatus to address the aforementioned technical problems.

A first aspect of this application is directed to an information processing method. The method may include: receiving information about a target application, wherein the target application includes a service module set including a plurality of service modules, each of the plurality of service modules comprises a page set with a module identifier configured for the service module, and each of a plurality of pages in the page set comprises a page identifier; parsing the information to determine whether the information includes a content including: an information source identifier, a first module identifier, and a first page identifier; and, in response to determining that the information includes the content, further determining whether the information source identifier meets a preset condition, and, in response to the information source identifier meeting the preset condition, jumping, by calling a preset jump protocol, to a target page based on the first module identifier and the first page identifier. The target page may be a page that is identified by the first page identifier, and the first page identifier may be included in a page set included in a service module that is identified by the first module identifier.

Each of the plurality of pages in the page set may have corresponding entry information. The preset jump protocol may include the entry information corresponding to each of the plurality of pages in the page set. The aforementioned method may further include: in response to determining that the information does not include the content, further determining whether the information includes a second page identifier and page entry information; and, in response to determining that the information includes the second page identifier and the page entry information, updating, based on the page entry information, entry information that is in the preset jump protocol and corresponding to a page identified by the second page identifier.

In some embodiments, in the aforementioned method, the preset condition may include that the information source identifier exists in the entry information corresponding to the page identified by the first page identifier.

In some embodiments, in the aforementioned method, each of the plurality of service modules in the service module set may support calling the preset jump protocol. Jumping, by calling a preset jump protocol, to a target page based on the first module identifier and the first page identifier may include: calling the preset jump protocol by using the service module identified by the first module identifier, and jumping to the target page based on the first module identifier and the first page identifier.

In some embodiments, the aforementioned method may further include: in response to determining that the information does not include the second page identifier or the page entry information, further determining whether the information includes a startup identifier used to instruct to start the target application; and, in response to determining that the information includes the startup identifier, starting the target application, determining, in a startup process, whether each of the plurality of service modules in the service module set and code of each of the plurality of pages in a page set included by the service module exist in code of the target application, and whether the service module and the page can be invoked normally, and sending an error message to a connected server when the corresponding code does not exist in the code of the target application, or the corresponding code cannot be invoked normally.

In some embodiments, in the aforementioned method, determining whether each of the plurality of service modules in the service module set and code of each of the plurality of pages in a page set included by the service module exist in code of the target application may include: determining, through reflection, whether each of the plurality of service modules in the service module set and the code of each of the plurality of pages in the page set included by the service module exist in the code of the target application.

In some embodiments, the aforementioned method may further include: in response to determining that the information does not include the startup identifier, further determining whether the information includes update information, and, in response to the information including the update information, updating, based on the update information, the target application. The update information may include one of page code and a plug-in installation package.

A second aspect of this application is directed to: an information processing apparatus. The apparatus may include a receiving unit, a determining unit, and a processing unit.

The receiving unit may be configured to receive information about a target application. The target application may include a service module set including a plurality of service modules. Each of the plurality of service modules may include a page set. A module identifier may be configured for the service module, and each of a plurality of pages in the page set may include a page identifier.

The determining unit may be configured to parse the information to determine whether the information includes a content including an information source identifier, a first module identifier, and a first page identifier.

The processing unit may be configured to: in response to determining that the information includes the content, further determine whether the information source identifier meets a preset condition, and, in response to the information source identifier meeting the preset condition, jump, by calling a preset jump protocol, to a target page based on the first module identifier and the first page identifier. The target page may be a page that is identified by the first page identifier, and the first page identifier is included in a page set included in a service module that is identified by the first module identifier.

Each of the plurality of pages in the page set may have corresponding entry information. The preset jump protocol may include the entry information corresponding to each of the plurality of pages in the page set. The apparatus may further include a first determining unit and a first update unit.

The first determining unit may be configured to: in response to determining that the information does not include the content, further determine whether the information includes a second page identifier and page entry information. The first update unit may be configured to: in response to determining that the information includes the second page identifier and the page entry information, update, based on the page entry information, entry information that is in the preset jump protocol and corresponding to a page identified by the second page identifier.

In some embodiments, in the aforementioned apparatus, the preset condition may include that the information source identifier exists in entry information corresponding to the page identified by the first page identifier.

In some embodiments, in the aforementioned apparatus, each of the plurality of service modules in the service module set may support calling the preset jump protocol. The processing unit may be further configured to call the preset jump protocol by using a service module identified by the first module identifier, and jump to the target page based on the first module identifier and the first page identifier.

In some embodiments, the aforementioned apparatus may further include a second determining unit and a startup unit.

The second determining unit may be configured to: in response to determining that the information does not include the second page identifier or the page entry information, further determine whether the information includes a startup identifier used to instruct to start the target application.

The startup unit may be configured to: in response to determining that the information includes the startup identifier, start the target application, determine, in a startup process, whether each of the plurality of service modules in the service module set and code of each of the plurality of pages in a page set included by the service module exist in code of the target application, and whether the service module and the page can be invoked normally, and send an error message to a connected server when the corresponding code does not exist in the code of the target application, or the corresponding code cannot be invoked normally.

In some embodiments, in the aforementioned apparatus, the startup unit may be further configured to determine, through reflection, whether each of the plurality of service modules in the service module set and the code of each of the plurality of pages in the page set included by the service module exist in the code of the target application.

In some embodiments, the apparatus may further include a second update unit. The second update unit may be configured to: in response to determining that the information does not include the startup identifier, further determine whether the information includes update information, and, in response to the information including the update information, update the target application based on the update information. The update information may include one of page code and a plug-in installation package.

A third aspect of this application is directed to: an electronic device. The electronic device may include one or more processors and a storage apparatus configured to store one or more programs. Upon being executed by the one or more processor, the one or more programs may cause the one or more processors to perform the method described in any one of the aforementioned embodiments.

A fourth aspect of this application is directed to: a computer readable storage medium. The computer readable storage medium may store a computer program. Upon being executed by a processor, the computer program may cause the processor to perform the method described in any one of the aforementioned embodiments.

According to the information processing method and apparatus provided in this application, received information about a target application may be parsed to determine whether the information includes a content including: an information source identifier, a first module identifier, and a first page identifier. The target application may include a service module set including a plurality of service modules, each service module may include a page set, and a module identifier may be configured for the service module. A page identifier may be configured for each of a plurality of pages in the page set. When it is determined that the information includes the content, whether the information source identifier meets a preset condition may be further determined, so that when the information source identifier meets the preset condition, a preset jump protocol may be called to jump to a target page based on the first module identifier and the first page identifier. Therefore, a page of the target application may be invoked by determining whether the information source identifier meets the preset condition and, when it is determined that the information source identifier meets the preset condition, by calling the preset jump protocol, thus realizing targeted information processing.

BRIEF DESCRIPTION OF THE DRAWINGS

Other features, objectives, and advantages of this application will become more apparent by reading the detailed descriptions of non-restrictive embodiments that are made with reference to the following accompanying drawings.

DETAIL DESCRIPTION OF THE EMBODIMENTS

The following further describes this application in detail with reference to the accompanying drawings and embodiments. It may be understood that the specific embodiments described herein are merely used to explain a related invention, but not to limit the invention. In addition, it should be further noted that, for ease of description, only parts related to the invention are shown in the accompanying drawings.

It should be noted that the embodiments of this application and features in the embodiments may be mutually combined when they do not conflict with each other. This application is described in detail below with reference to the accompanying drawings and in combination with the embodiments.

Figure 1:
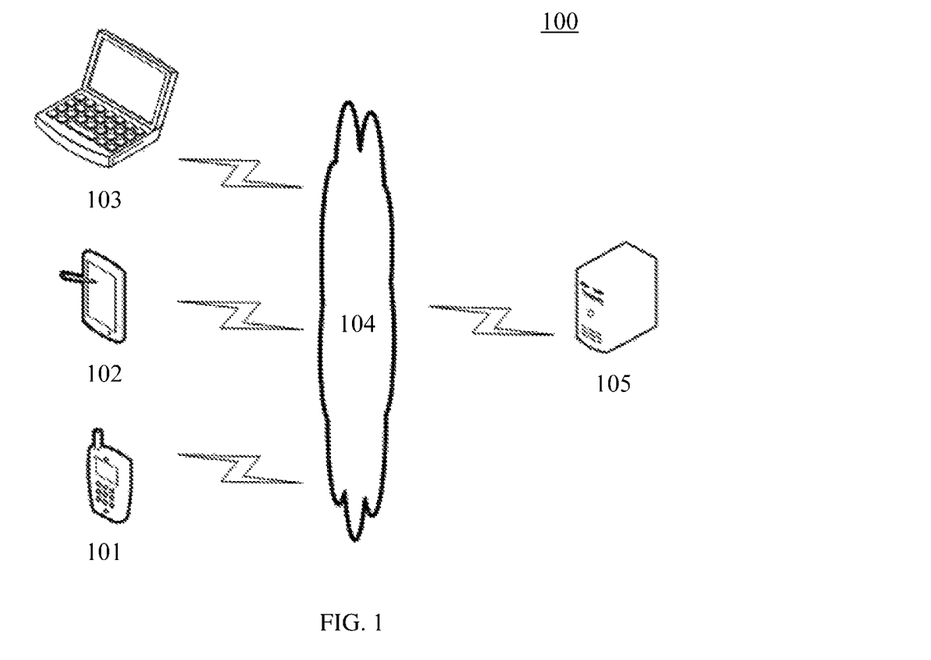
FIG. 1 is a diagram of a system architecture to which this application may be applicable.

FIG. 1 shows an example system architecture 100 of an embodiment to which an information processing method or an information processing apparatus of this application may be applicable.

As shown in FIG. 1, the system architecture 100 may include terminal devices 101, 102, and 103, a network 104, and a server 105. The network 104 may be configured to provide communication link mediums between each of the terminal devices 101, 102, and 103 and the server 105. The network 104 may include various connection types, such as wired and wireless communication links, and optical fibers.

Various communication client applications may be installed on the terminal devices 101, 102, and 103, such as a web browser application and a shopping application. The client applications installed on the terminal devices 101, 102, and 103 may have a modular architecture. For example, the client application may include a service module set, and each service module in the service module set may include a page set.

A user may interact with the server 105 through the network 104 by using the terminal devices 101, 102, and 103 to receive or send messages and the like. For example, the terminal devices 101, 102, and 103 may receive information about a target application (i.e., the client application that has the modular structure) that is sent by the server 105, and process the information (e.g., analyze the information). The terminal devices 101, 102, and 103 may further receive information about the target application that is manually triggered by the user on the terminal devices, and process the information (e.g., analyze the information).

The terminal devices 101, 102, and 103 may be various electronic devices, including but not limited to a smartphone, a tablet computer, an e-book reader, a laptop portable computer, and a desktop computer.

The server 105 may be a server providing various services, such as a background server that supports the target application installed on the terminal devices 101, 102, and 103. The background server may send the information about the target application (e.g., prompt information used to prompt update of the target application) to the terminal device on which the target application is installed.

It should be noted that the information processing method provided in the embodiments of this application is usually performed by the terminal devices 101, 102, and 103, and correspondingly, an information processing apparatus is usually disposed on the terminal devices 101, 102, and 103.

It should be understood that a quantity of terminal devices, a quantity of networks, and a quantity of servers in FIG. 1 are merely an example. According to actual requirements, there may be any quantity of terminal devices, networks, and servers.

It should be noted that if the information about the target application that is received by the terminal devices 101, 102, and 103 is not sent by the server 105, the system architecture 100 may not include the server 105.

Figure 2:
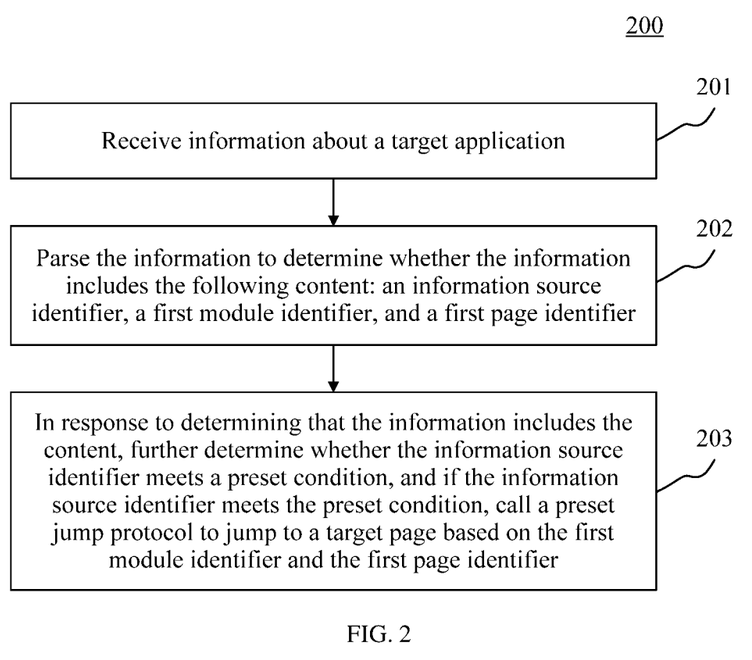
FIG. 2 is a flowchart of an embodiment of an information processing method of this application.

FIG. 2 shows a procedure 200 of an embodiment of an information processing method of this application. The information processing method may include the following steps.

In step 201, information about a target application is received.

In this embodiment, an electronic device (e.g., the terminal devices 101, 102, and 103 shown in FIG. 1) that runs the information processing method may locally receive the information about the target application, or may receive the information about the target application from a connected server (e.g., the server 105 shown in FIG. 1). The target application may include a service module set including a plurality of service modules. Each of the plurality of service modules in the service module set may include a page set. A module identifier may be set for each of the plurality of service modules in the service module set (the module identifier may be, for example, a number or a name of the service module), and a page identifier may be set for each of the plurality of pages in a page set included by the service module (the page identifier may be, for example, a number, a name, or a uniform resource locator of the page). The service modules in the service module set may correspond to different service types. For example, the service types may include order inquiry, shopping trolley, logistics query, and the like. Each page in a page set included by each service module may be a page used to provide a service identified by a service type corresponding to the service module. It should be noted that the information about the target application may be, for example, page jump information or application update information.

In step 202, the information may be parsed to determine whether the information includes the content of: an information source identifier, a first module identifier, and a first page identifier.

In this embodiment, after receiving the information about the target application, the electronic device may parse the information to determine whether the information includes the content of: the information source identifier, the first module identifier, and the first page identifier. The information source identifier may be an identifier of a sender of the information about the target application that is received by the electronic device, and the sender may be one of a client application and a page. The client application may be an application installed on the electronic device, and the page may be a page in the page set included by the service module in the service module set. The first module identifier may be a module identifier of the service module in the service module set, and the first page identifier may be a page identifier of the page in the page set included by the service module. It should be noted that, in addition to an identifier (e.g., the first module identifier and first page identifier), the information about the target application may further include a parameter name corresponding to the identifier. The electronic device may parse the information to obtain each parameter name, and identify the parameter name to determine whether the information includes the content. It should be noted that if the electronic device determines that the received information about the target application includes the content, it may indicate that the information is page jump information, and the electronic device may continue to perform step 203.

In step 203, in response to determining that the information includes the content, it may be further determined that whether the information source identifier meets a preset condition. If the information source identifier meets the preset condition, a preset jump protocol may be called to jump to a target page based on the first module identifier and the first page identifier.

In this embodiment, in response to that the electronic device determines that the received information about the target application includes the content, the electronic device may further determine whether the information source identifier meets the preset condition, and, if the information source identifier meets the preset condition, the electronic device may call the preset jump protocol to jump to the target page based on the first module identifier and the first page identifier. The target page may be a page that is identified by the first page identifier and in the page set included in the service module identified by the first module identifier. If the information source identifier is an application identifier of a client application, the preset condition may include that the information source identifier exists in an application identifier set.

A client application identified by an application identifier in the application identifier set may be an application that has permissions to access a page of the target application, and the application identifier set may be pre-stored on the electronic device. It should be noted that the preset jump protocol may be, for example, the OpenURL protocol or the URL Schema protocol. Both the OpenURL protocol and the URL Schema protocol can invoke different client applications, and can invoke internal pages of a same client application. The preset jump protocol may include, for example, parameter names respectively corresponding to a module identifier and a page identifier. The electronic device may transmit the first module identifier and the first page identifier to the preset jump protocol, and call the preset jump protocol to jump to the target page.

In some optional implementations of this embodiment, in addition to the content, the information about the target application that is received by the electronic device may further include parameter information. The parameter information may include, for example, a parameter required for entering the page identified by the first page identifier, such as a merchant identifier or a food identifier. The preset jump protocol may further include a parameter name of each parameter included in the parameter information. When transmitting the first module identifier and the first page identifier to the preset jump protocol, the electronic device may further transmit the parameter information to the preset jump protocol, and call the jump protocol to jump to the target page.

In some optional implementations of this embodiment, each page in the page set included by each service module in the service module set may have corresponding entry information, and the preset condition may include that the information source identifier exists in entry information corresponding to the page identified by the first page identifier. Each page in the page set may have at least one entry (e.g., a picture, text, and a link), and entry information corresponding to the page may include, for example, an entry identifier of each entry of the page (e.g., the identifier may be a name of the entry or a character included in the entry). The information source identifier may be an entry identifier of an entry corresponding to the information about the target application that is received by the electronic device. It should be noted that the information about the target application that is received by the electronic device and that includes the content may be information sent by a user of the electronic device by tapping and selecting the entry of the page identified by the first page identifier.

In some optional implementations of this embodiment, each service module in the service module set may have corresponding logic (e.g., logic for determining whether the information source identifier meets the preset condition, or logic for calling the preset jump protocol). When each service module in the service module set has the logic, the service module may support determining whether the information source identifier meets the preset condition, and support calling the preset jump protocol. The electronic device may transmit the content to the service module identified by the first module identifier. The electronic device may determine, by using the service module, whether the information source identifier meets the preset condition, and, when it is determined that the information source identifier meets the preset condition, call the preset jump protocol by using the service module to jump to the target page based on the first module identifier and the first page identifier.

In some optional implementations of this embodiment, the target application may cite a third-party library (e.g., a code library provided by a third party). The target application may cite the third-party library, by using code that is locally deployed on the electronic device in advance and that provides an interface proxy function, to fully decouple from the third-party library. It should be noted that each service module in the service module set included by the target application with the modular architecture may be loosely coupled to another service module, any service module may be tightly coupled to each page in a page set included by the service module, and the target application and the third-party library cited by the target application may be proxied by using the code that is on the electronic device and provides the interface proxy function. This facilitates service expansion of the target application and module reuse.

Figure 3:
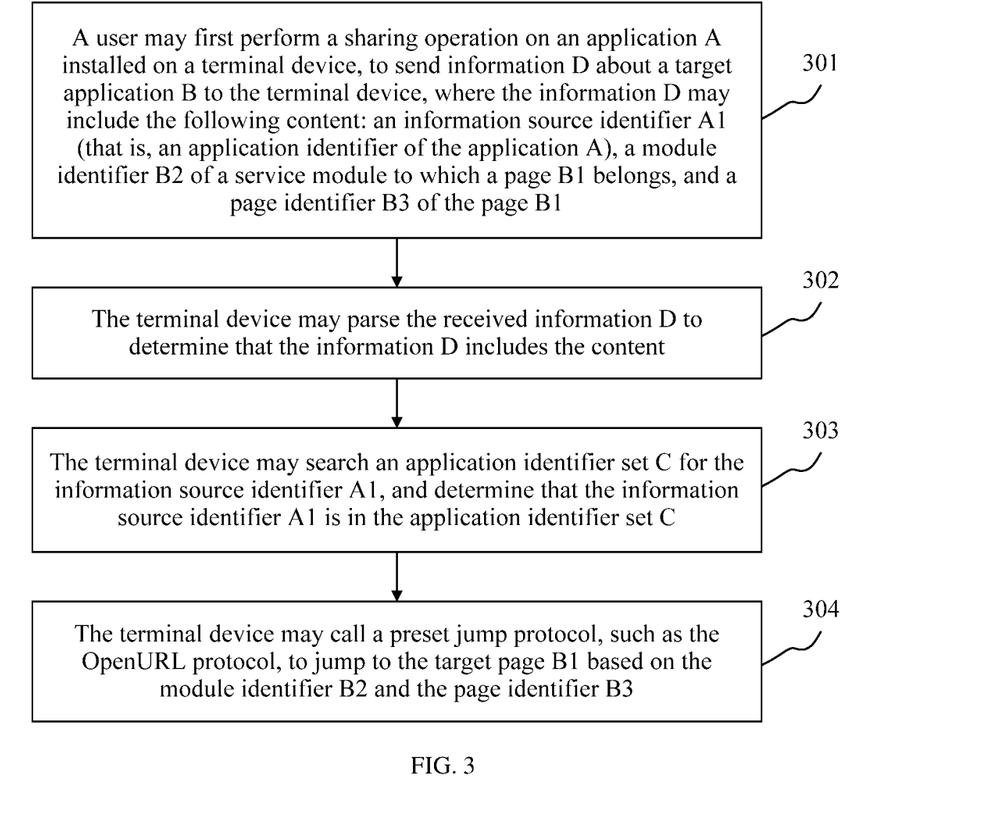
FIG. 3 is a schematic diagram of an application scenario of an information processing method of this application.

FIG. 3 is a schematic diagram of an application scenario of the information processing method of this application. In the application scenario in FIG. 3, an application A and a target application B may be installed on a terminal device, and the terminal device may locally store an application identifier set C. An application identifier A1 may be configured for the application A, and the application A may have permissions to access a page B1 in the target application B through information sharing. A client application identified by each application identifier in the application identifier set C may have permissions to access a page in the target application B, and the application identifier A1 may be included in the application identifier set C.

As shown by the label 301, a user may first perform a sharing operation on the application A installed on the terminal device to send information D about the target application B to the terminal device. The information D may include the content of: an information source identifier A1 (i.e., an application identifier of the application A), a module identifier B2 of a service module to which the page B1 belongs, and a page identifier B3 of the page B1. Then, as shown by the label 302, the terminal device may parse the received information D to determine that the information D includes the content. Then, as shown by the label 303, the terminal device may search the application identifier set C for the information source identifier A1, and determine that the information source identifier A1 is in the application identifier set C. Finally, as shown by the label 304, the terminal device may call a preset jump protocol, such as the OpenURL protocol, to jump to the target page B1 based on the module identifier B2 and the page identifier B3.

In the method provided in the foregoing embodiment of this application, by effectively relying on the determination of whether the information source identifier meets the preset condition, and, in the case that the information source identifier meets the preset condition, on the calling of the preset jump protocol, a page of the target application may be invoked, thus realizing targeted information processing.

Figure 4:
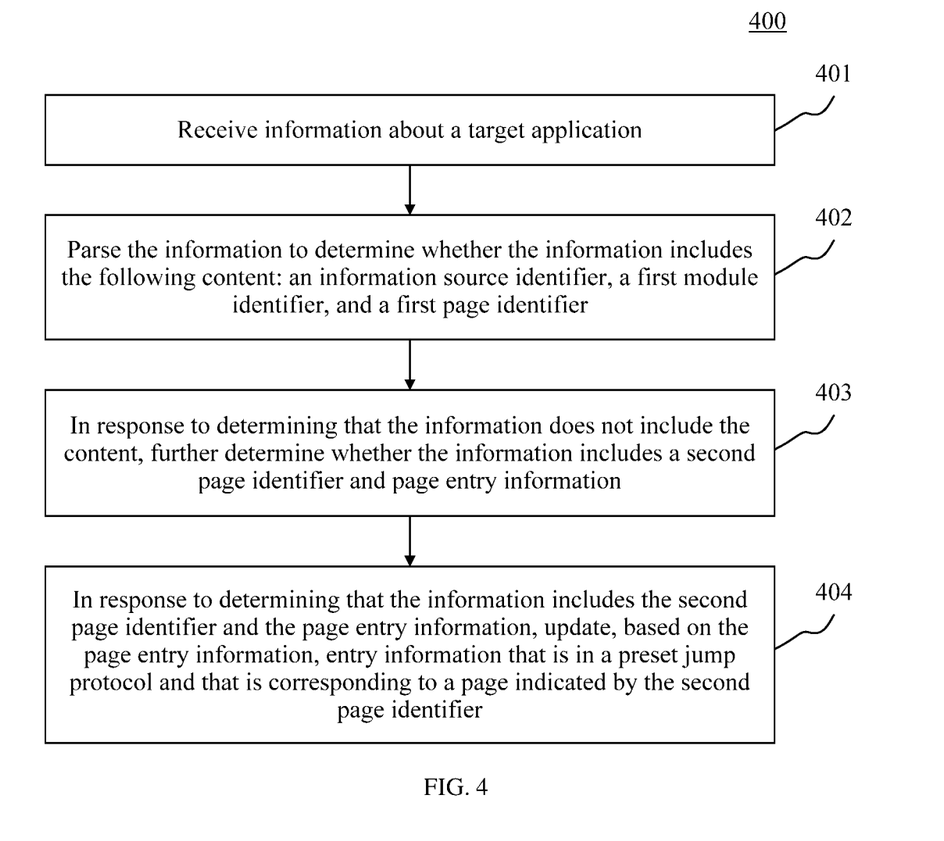
FIG. 4 is a flowchart of another embodiment of an information processing method of this application.

FIG. 4 shows a procedure 400 of another embodiment of an information processing method. The procedure 400 of the information processing method may include the following steps.

In step 401, information about a target application may be received.

In step 402, the information may be parsed to determine whether the information includes the content of: an information source identifier, a first module identifier, and a first page identifier.

In this embodiment, related descriptions in step 201 and step 202 in the embodiment shown in FIG. 2 may be referred to for explanations and descriptions of step 401 and step 402, respectively. Therefore, details of these steps are not repeatedly described herein.

In step 403, in response to determining that the information does not include the content, it may be further determined that whether the information includes a second page identifier and page entry information.

In this embodiment, in response to that an electronic device that runs the information processing method determines that the received information about the target application does not include the content, the electronic device may further determine whether the information includes the second page identifier and the page entry information. The second page identifier may be a page identifier of a page in a page set included by a service module in a service module set included by the target application. The page entry information may be information about a new entry corresponding to a page identified by the second page identifier (e.g., the information is an entry identifier of the new entry). The electronic device may determine, for example, by using the method for determining whether the information about the target application includes the content in step 202 in the method shown in FIG. 2, whether the information includes the second page identifier and the page entry information.

In step 404, in response to determining that the information includes the second page identifier and the page entry information, entry information that is in the preset jump protocol and corresponding to a page identified by the second page identifier may be updated based on the page entry information.

In this embodiment, in response to that the electronic device determines that the received information about the target application includes the second page identifier and the page entry information, the electronic device may update, based on the page entry information, the entry information that is in the preset jump protocol and corresponding to the page identified by the second page identifier. For example, the page entry information may be inserted into the entry information corresponding to the page identified by the second page identifier, or the entry information corresponding to the page identified by the second page identifier may be replaced with the page entry information. The electronic device may perform a corresponding update operation according to an actual situation.

In some optional implementations of this embodiment, if the electronic device determines that the received information about the target application does not include the second page identifier or the page entry information, the electronic device may further determine whether the information includes a startup identifier used to instruct to start the target application. If the information includes the startup identifier, the electronic device may start the target application and determine, in a startup process, whether each service module in the service module set and code of each page in a page set included by the service module exist in code of the target application, and whether the service module and the page can be invoked normally. The electronic device may send an error message to a connected server (e.g., the server 105 in FIG. 1) when there is at least one of the following cases for the service module and/or the page: the corresponding code does not exist in the code of the target application, and the corresponding code cannot be invoked normally. Thus, when the target application has an error, a developer of the target application may obtain error information in time and repair the error. It should be noted that, when the target application is started, each service module in the service module set and each page in the page set included by the service module may be registered on the electronic device. The electronic device may determine, through reflection, whether each service module in the service module set and the code of each page in the page set included by the service module exist in the code of the target application. In this application, "reflection" means a capability that a program can access, detect, and modify a status or behavior of the program itself. In addition, the electronic device may attempt, by using the preset jump protocol, to call each service module in the service module set and each page in the page set included by the service module to determine whether the service module and the page can be invoked normally.

In some optional implementations of this embodiment, if the electronic device determines that the received information about the target application does not include the startup identifier, the electronic device may further determine whether the information includes update information. If the information includes the update information, the electronic device may update the target application based on the update information. The update information may include one of the following: a page code and a plug-in installation package. For example, when the update information includes the page code, the update information may further include location information. The electronic device may write the page code into a location identified by the location information, and classify a page corresponding to the page code as a page set included by a service module to which the page belongs. When the update information includes the plug-in installation package, the electronic device may perform a decompression operation on the plug-in installation package, and run and install a decompressed installation file, and the electronic device may further classify a plug-in (i.e., the service module) corresponding to the plug-in installation package as the service module set. Because the target application uses a modular architecture, the electronic device may implement hot update on the target application when determining that the received information about the target application includes the update information.

It can be seen from FIG. 4 that, compared with the embodiment corresponding to FIG. 2, the procedure 400 of the information processing method in this embodiment includes a step of updating entry information of a page in the preset jump protocol. Therefore, by managing entry information of each page in the target application through a protocol, necessary update to an entry information can be completed. Compared to an application that uses a conventional architecture, in which a location of a page on which entry information is to be modified needs to be manually identified, invoked, and modified individually, tremendous manpower can be saved, and it is less likely that new vulnerabilities being introduced during the process.

Figure 5:
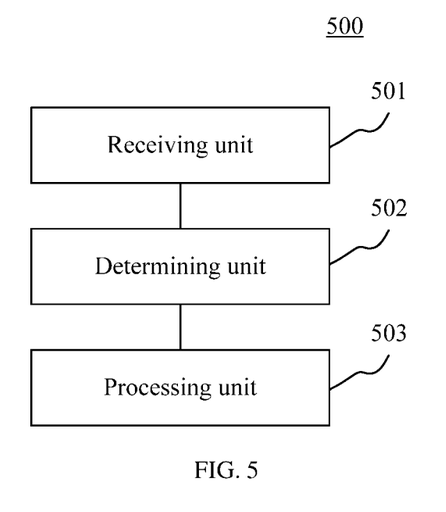
FIG. 5 is a schematic structural diagram of an embodiment of an information processing apparatus of this application.

Referring to FIG. 5, as an implementation of the methods shown in the foregoing embodiments, this application further provides an information processing apparatus. The apparatus embodiment may correspond to the method embodiment shown in FIG. 2, and the apparatus may be applied to various electronic devices.

As shown in FIG. 5, an information processing apparatus 500 shown in this embodiment may include a receiving unit 501, a determining unit 502, and a processing unit 503.

The receiving unit 501 may be configured to receive information about a target application. The target application may include a service module set including a plurality of service modules. Each service module in the service module set may include a page set, a module identifier may be configured for the service module, and a page identifier may be configured for each of a plurality of pages in the page set. The determining unit 502 may be configured to parse the information to determine whether the information includes the following content: an information source identifier, a first module identifier, and a first page identifier. The processing unit 503 may be configured to: in response to determining that the information includes the content, further determine whether the information source identifier meets a preset condition, and, if the information source identifier meets the preset condition, call a preset jump protocol to jump to a target page based on the first module identifier and the first page identifier. The target page may be a page that is identified by the first page identifier and included in a page set included in a service module identified by the first module identifier.

In this embodiment of the information processing apparatus 500, related descriptions in step 201, step 202, and step 203 in the embodiment corresponding to FIG. 2 may be referred to for specific processing performed by and technical effects brought by the receiving unit 501, the determining unit 502, and the processing unit 503, respectively, which are not repeatedly described herein for the sake of conciseness.

In some optional implementations of this embodiment, each page in the page set may have corresponding entry information, and the preset condition may include that the information source identifier exists in entry information corresponding to the page identified by the first page identifier.

In some optional implementations of this embodiment, each service module in the service module set may support calling the preset jump protocol, and the processing unit 503 may be further configured to call the preset jump protocol, by using a service module identified by the first module identifier, to jump to the target page based on the first module identifier and the first page identifier.

In some optional implementations of this embodiment, the preset jump protocol may include the entry information corresponding to each page in the page set, and the apparatus 500 may further include a first determining unit (not shown in the drawings) and a first update unit (not shown in the drawings).

The first determining unit may be configured to: in response to determining that the information does not include the content, further determine whether the information includes a second page identifier and page entry information. The first update unit may be configured to: in response to determining that the information includes the second page identifier and the page entry information, update, based on the page entry information, entry information that is in the preset jump protocol and corresponding to a page identified by the second page identifier.

In some optional implementations of this embodiment, the apparatus 500 may further include a second determining unit (not shown in the drawings) and a startup unit (not shown in the drawings).

The second determining unit may be configured to: in response to determining that the information does not include the second page identifier or the page entry information, further determine whether the information includes a startup identifier used to instruct to start the target application. The startup unit may be configured to: in response to determining that the information includes the startup identifier, start the target application, determine, in a startup process, whether each service module in the service module set and code of each page in a page set included by the service module exist in code of the target application, and whether the service module and the page can be invoked normally, and send an error message to a connected server when at least one of the following cases exists for the service module and/or the page: the corresponding code does not exist in the code of the target application and the corresponding code cannot be invoked normally.

In some optional implementations of this embodiment, the startup unit may be further configured to determine, through reflection, whether each service module in the service module set and the code of each page in the page set included by the service module exist in the code of the target application.

In some optional implementations of this embodiment, the apparatus 500 may further include a second update unit (not shown in the drawings). The second update unit may be configured to: in response to determining that the information does not include the startup identifier, further determine whether the information includes update information, and, if the information includes the update information, update the target application based on the update information. The update information may include one of the following: page code and a plug-in installation package.

According to the apparatus provided in the foregoing embodiment of this application, by effectively relying on the determination of whether the information source identifier meets the preset condition, and, in the case that the information source identifier meets the preset condition, on the calling of the preset jump protocol, a page of the target application may be invoked, thus realizing targeted information processing.

Figure 6:
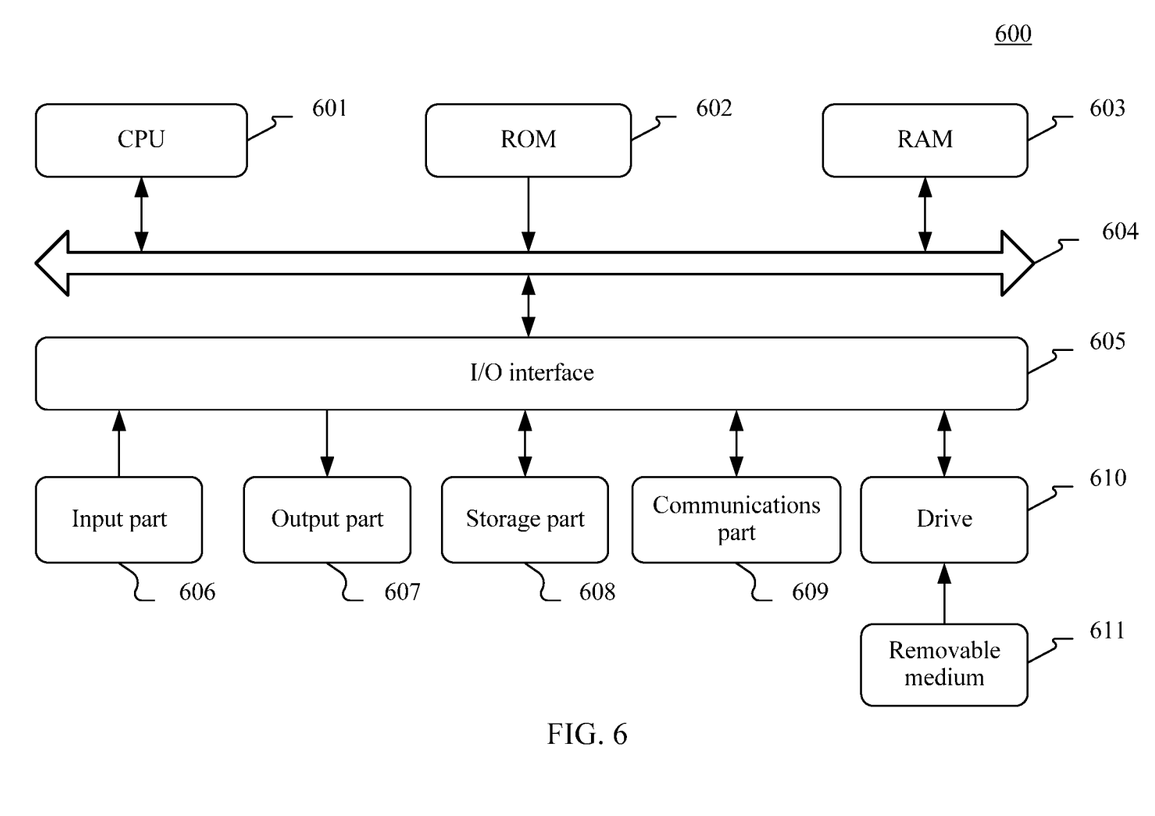
FIG. 6 is a schematic structural diagram of a computer system for implementing an electronic device according to an embodiment of this application.

FIG. 6 is a schematic structural diagram of a computer system 600 suitable for implementing an electronic device according to an embodiment of this application. The electronic device shown in FIG. 6 is merely an example, and should not impose any limitation on a function and an applicable scope of this embodiment of this application.

As shown in FIG. 6, the computer system 600 may include a central processing unit (CPU) 601, and may perform various proper actions and processing based on a program stored in a read-only memory (ROM) 602 or a program loaded to a random access memory (RAM) 603 from a storage part 608. The RAM 603 may further store various programs and data required by the system 600 to perform operations. The CPU 601, the ROM 602, and the RAM 603 may be connected to each other by using a bus 604. An input/output (I/O) interface 605 may also be connected to the bus 604.

The I/O interface 605 may be connected with the following components: an input component 606 such as a keyboard or a mouse; an output component 607 including a cathode ray tube (CRT), a liquid crystal display (LCD), a loudspeaker, and the like; the storage component 608 such as a hard disk; and a communication component 609 including a network interface card such as a LAN card or a modem. The communication component 609 may communicate by using a network such as the Internet. A drive 610, if necessary, may also be connected to the I/O interface 605. A removable medium 611 such as a disk, an optical disk, a magneto-optical disk, or a semiconductor memory may be installed on the drive 610, so that a computer program read from the drive 610 may be installed on the storage component 608 if necessary.

In particular, according to the embodiments in this application, a process described in the foregoing flowchart may be implemented as a computer software program. For example, the embodiments in this application include a computer program product including a computer program carried on a computer readable medium, and the computer program may include program code used for performing the method shown in the flowchart. In such embodiments, the computer program may be downloaded from the network and installed by using the communication component 609 and/or installed from the removable medium 611. When the computer program is executed by the central processing unit (CPU) 601, the computer program may cause the CPU 601 to perform the methods of the foregoing embodiments of this application.

It should be noted that the computer readable medium shown in this application may be a computer readable signal medium or a computer readable storage medium or any combination of the two. The computer readable storage medium may include, but not be limited to, a system, an apparatus, or a component of electricity, magnetism, optics, electromagnetism, infrared, or semiconductor, or any combination thereof. More specific examples of the computer readable storage medium may include but not be limited to: an electrical connection with one or more conducting wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this application, the computer readable storage medium may be any tangible medium that includes or stores a program, and the program may be used by or in combination with an instruction execution system, apparatus, or component. In this application, the computer readable signal medium may be included in a baseband or a data signal used as a part of a carrier, and the computer readable signal medium carries computer readable program code.

The transmitted data signal may be in a plurality of forms, including but not limited to an electromagnetic signal, an optical signal, or any proper combination thereof. The computer readable signal medium may alternatively be any computer readable medium other than the computer readable storage medium. The computer readable medium may send, propagate, or transmit the program used by or in combination with an instruction execution system, apparatus, or component. The program code included in the computer readable medium may be transmitted by using any suitable medium, including but not limited to: wireless, electric wires, optical fibers, RF, and the like, or any proper combination thereof.

The flowcharts and block diagrams in the accompanying drawings show architectures, functions, and operations that may be implemented by the system, method, and computer program product in the embodiments of this application. In this case, each block in the flowchart or block diagram may represent a part of a module, a program segment, or code, and the part of the module, program segment, or code includes one or more executable instructions for implementing a specified logical function. It should also be noted that, in some replaceable implementations, functions marked in the blocks may also occur in a sequence different from the sequence marked in the accompanying drawings. For example, two successive blocks may actually be executed in parallel, and sometimes may be performed in a reverse order, depending on involved functions. It should also be noted that each block in the block diagram or flowchart and a combination of blocks in the block diagram or flowchart may be implemented by using a dedicated hardware-based system used for executing a specified function or operation, or may be implemented by using a combination of dedicated hardware and a computer instruction.

The units described in the embodiments of this application may be implemented by using software, or may be implemented by using hardware. The described units may alternatively be disposed on a processor. For example, it may be described as follows: a processor includes a receiving unit, a determining unit, and a processing unit. In this case, names of the units do not constitute a limitation on the units. For example, the receiving unit may alternatively be described as "a unit used for receiving information about a target application".

In another aspect, this application further provides a computer readable medium, and the computer readable medium may be included in the electronic device described in the foregoing embodiments, or may exist independently and is not assembled in the electronic device. The computer readable medium may store one or more programs, and when the one or more programs are executed by the electronic device, the electronic device may perform operations.

The operations may include: receiving information about a target application, wherein the target application includes a service module set including a plurality of service modules, each service module in the service module set includes a page set, a module identifier is configured for the service module, and a page identifier is configured for each of a plurality of pages in the page set; parsing the information to determine whether the information includes a content including: an information source identifier, a first module identifier, and a first page identifier; and, in response to determining that the information includes the content, further determining whether the information source identifier meets a preset condition, and, if the information source identifier meets the preset condition, jump, by calling a preset jump protocol, to a target page based on the first module identifier and the first page identifier. The target page may be a page that is identified by the first page identifier, and the first page identifier may be included in a page set included in a service module that is identified by the first module identifier.

The foregoing descriptions are merely example embodiments of this application and descriptions of applied technical principles. A person skilled in the art should understand that the scope of invention involved in this application is not limited to a technical solution of a specific combination of the foregoing technical features, and should also cover other technical solutions formed by combining the foregoing technical features or their equivalent features at random without departing from the foregoing inventive concept, for example, a technical solution formed by replacing the foregoing feature with a technical feature having a similar function that has been disclosed in (but is not limited to) this application or vice versa.

What is claimed is:

1. An information processing method, comprising:
receiving information about a target application, wherein the target application comprises a service module set comprising a plurality of service modules, each of the plurality of service modules in the service module set comprises a page set, with a module identifier configured for the service module, and each of a plurality of pages in the page set comprises a page identifier;
parsing the information to determine whether the information comprises a content including: an information source identifier, a first module identifier, and a first page identifier; and
in response to determining that the information comprises the content, further determining whether the information source identifier meets a preset condition, and, in response to the information source identifier meeting the preset condition, jumping, by calling a preset jump protocol, to a target page based on the first module identifier and the first page identifier, wherein the target page is a page that is identified by the first page identifier, and the first page identifier is included in a page set comprised in a service module that is identified by the first module identifier,
wherein each of the plurality of pages in the page set has corresponding entry information, the preset jump protocol comprises the entry information corresponding to each of the plurality of pages in the page set, and wherein the method further comprises:
in response to determining that the information does not comprise the content, further determining whether the information comprises a second page identifier and page entry information; and
in response to determining that the information comprises the second page identifier and the page entry information, updating, based on the page entry information, entry information that is in the preset jump protocol and corresponding to a page identified by the second page identifier.

2. The method of claim 1, wherein the preset condition comprises that the information source identifier exists in the entry information corresponding to the page identified by the first page identifier.

3. The method of claim 1, wherein each of the plurality of service modules in the service module set supports calling the preset jump protocol,
and wherein jumping, by calling a preset jump protocol, to a target page based on the first module identifier and the first page identifier comprises:
calling the preset jump protocol by using the service module identified by the first module identifier; and
jumping, based on the first module identifier and the first page identifier, to the target page.

4. The method of claim 1, further comprising:
in response to determining that the information does not comprise the second page identifier or the page entry information, further determining whether the information comprises a startup identifier used to instruct to start the target application; and
in response to determining that the information comprises the startup identifier, starting the target application, and determining, in a startup process, whether each of the plurality of service modules in the service module set and code of each of the plurality of pages in a page set comprised by the service module exist in code of the target application, and whether the service module and the page can be invoked normally, and sending an error message to a connected server when the corresponding code does not exist in the code of the target application, or the corresponding code cannot be invoked normally.

5. The method of claim 4, wherein determining whether each of the plurality of service modules in the service module set and code of each of the plurality of pages in a page set comprised by the service module exist in code of the target application comprises:
determining, through reflection, whether each of the plurality of service modules in the service module set and the code of each of the plurality of pages in the page set comprised by the service module exist in the code of the target application.

6. The method of claim 4, further comprising:
in response to determining that the information does not comprise the startup identifier, further determining whether the information comprises update information, and, in response to the information comprising the update information, updating, based on the update information, the target application, wherein the update information comprises one of page code and a plug-in installation package.

7. An information processing apparatus, comprising:
a receiving unit, configured to receive information about a target application, wherein the target application comprises a service module set comprising a plurality of service modules, each of the plurality of service modules in the service module set comprises a page set, with a module identifier configured for the service module, and each of a plurality of pages in the page set comprises a page identifier;
a determining unit, configured to parse the information to determine whether the information comprises a content including: an information source identifier, a first module identifier, and a first page identifier; and
a processing unit, configured to: in response to determining that the information comprises the content, further determine whether the information source identifier meets a preset condition, and, in response to the information source identifier meeting the preset condition, jump, by calling a preset jump protocol, to a target page based on the first module identifier and the first page identifier, wherein the target page is a page that is identified by the first page identifier, and the first page identifier is included in a page set comprised in a service module that is identified by the first module identifier,
wherein each of the plurality of pages in the page set has corresponding entry information, the preset jump protocol comprises the entry information corresponding to each of the plurality of pages in the page set, and wherein the apparatus further comprises:
a first determining unit, configured to: in response to determining that the information does not comprise the content, further determine whether the information comprises a second page identifier and page entry information; and
a first update unit, configured to: in response to determining that the information comprises the second page identifier and the page entry information, update, based on the page entry information, entry information that is in the preset jump protocol and corresponding to a page identified by the second page identifier.

8. The apparatus of claim 7, the preset condition comprises that the information source identifier exists in entry information corresponding to the page identified by the first page identifier.

9. The apparatus of claim 7, wherein each of the plurality of service modules in the service module set supports calling the preset jump protocol, and wherein the processing unit is further configured to:
call the preset jump protocol by using the service module identified by the first module identifier; and
jump, based on the first module identifier and the first page identifier, to the target page.

10. The apparatus of claim 7, wherein the apparatus further comprises:
a second determining unit, configured to: in response to determining that the information does not comprise the second page identifier or the page entry information, further determine whether the information comprises a startup identifier used to instruct to start the target application; and
a startup unit, configured to: in response to determining that the information comprises the startup identifier, start the target application, determine, in a startup process, whether each of the plurality of service modules in the service module set and code of each of the plurality of pages in a page set comprised by the service module exist in code of the target application, and whether the service module and the page can be invoked normally, and send an error message to a connected server when the corresponding code does not exist in the code of the target application, or the corresponding code cannot be invoked normally.

11. The apparatus of claim 10, wherein the startup unit is further configured to:
determine, through reflection, whether each of the plurality of service modules in the service module set and the code of each of the plurality of pages in the page set comprised by the service module exist in the code of the target application.

12. The apparatus of claim 10, further comprising:
a second update unit, configured to: in response to determining that the information does not comprise the startup identifier, further determine whether the information comprises update information, and, in response to the information comprising the update information, update, based on the update information, the target application, wherein the update information comprises one of: page code and a plug-in installation package.

13. An electronic device, comprising:
one or more processors; and
a storage apparatus, configured to store one or more programs, wherein, upon being executed by the one or more processors, the one or more programs cause the one or more processors to perform the method of claim 1.

14. A computer readable storage medium, storing a computer program, wherein, upon being executed by a processor, the computer program causes the processor to perform an information processing method, comprising:
receiving information about a target application, wherein the target application comprises a service module set comprising a plurality of service modules, each of the plurality of service modules in the service module set comprises a page set, with a module identifier configured for the service module, and each of a plurality of pages in the page set comprises a page identifier;
parsing the information to determine whether the information comprises a content including: an information source identifier, a first module identifier, and a first page identifier; and
in response to determining that the information comprises the content, further determining whether the information source identifier meets a preset condition, and, in response to the information source identifier meeting the preset condition, jumping, by calling a preset jump protocol, to a target page based on the first module identifier and the first page identifier, wherein the target page is a page that is identified by the first page identifier, and the first page identifier is included in a page set comprised in a service module that is identified by the first module identifier,
wherein each of the plurality of pages in the page set has corresponding entry information, the preset jump protocol comprises the entry information corresponding to each of the plurality of pages in the page set, and wherein the method further comprises:
in response to determining that the information does not comprise the content, further determining whether the information comprises a second page identifier and page entry information; and
in response to determining that the information comprises the second page identifier and the page entry information, updating, based on the page entry information, entry information that is in the preset jump protocol and corresponding to a page identified by the second page identifier.

* * * * *